(12) United States Patent
Liang et al.

(10) Patent No.: US 11,677,069 B2
(45) Date of Patent: Jun. 13, 2023

(54) SILICON-CARBON COMPOSITE MATERIAL AND PREPARATION METHOD AND USE THEREOF

(71) Applicants: China Energy Investment Corporation Limited, Beijing (CN); National Institute of Clean-and-Low-Carbon Energy, Beijing (CN)

(72) Inventors: Peng Liang, Beijing (CN); Wenbin Liang, Beijing (CN); Chang Wei, Beijing (CN); Junqing Liu, Beijing (CN); Dongfang Zheng, Beijing (CN); Guanghong Pan, Beijing (CN)

(73) Assignees: China Energy Investment Corporation Limited, Beijing (CN); National Institute of Clean-And-Low-Carbon Energy, Beijing (CN)

( * ) Notice: Subject to any disclaimer, the term of this patent is extended or adjusted under 35 U.S.C. 154(b) by 239 days.

(21) Appl. No.: 17/056,226

(22) PCT Filed: Aug. 13, 2018

(86) PCT No.: PCT/CN2018/100252
§ 371 (c)(1),
(2) Date: Nov. 17, 2020

(87) PCT Pub. No.: WO2019/218503
PCT Pub. Date: Nov. 21, 2019

(65) Prior Publication Data
US 2021/0234157 A1 Jul. 29, 2021

(30) Foreign Application Priority Data
May 18, 2018 (CN) .......................... 201810480951.1

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/386* (2013.01); *H01M 4/483* (2013.01); *H01M 4/587* (2013.01);
(Continued)

(58) Field of Classification Search
CPC ...... H01M 4/364; H01M 4/386; H01M 4/483; H01M 4/587; H01M 10/0525;
(Continued)

(56) References Cited

U.S. PATENT DOCUMENTS

2016/0079593 A1  3/2016 Meng et al.
2016/0190552 A1  6/2016 Murata et al.

FOREIGN PATENT DOCUMENTS

CN  102169985  8/2011
CN  102394288  3/2012
(Continued)

OTHER PUBLICATIONS

International Search Report (w/ English translation) and Written Opinion for corresponding PCT Application No. PCT/CN2018/100252 dated Jan. 9, 2019, 10 pages.
(Continued)

*Primary Examiner* — Andrew J. Oyer
(74) *Attorney, Agent, or Firm* — Conley Rose, P.C.; Brooks W Taylor

(57) ABSTRACT

The present disclosure relates to the field of carbonaceous composite materials, in particular to a silicon-carbon composite material and a preparation method and a use thereof. The silicon-carbon composite material comprises a composite carbon material and nanometer silicon dispersed therein,
(Continued)

wherein the composite carbon material is consisting of a graphitic crystal phase and an amorphous carbon phase, wherein the ratio $I_{002}/I_{amor}$ of the peak intensity $I_{002}$ of the graphite crystal phase (002) plane relative to the peak intensity $I_{amor}$ of the amorphous carbon phase as measured by the X-Ray Diffraction (XRD) is within a range of 0.1-40, the graphite crystalline phase is uniformly dispersed in the composite material, the dispersion coefficient δ of the ratio Id/Ig of Id and Ig as measured by Raman data is less than 0.8. The silicon-carbon composite material provided by the present disclosure can be used as an anode material of a lithium ion battery, such that the lithium ion battery has desirable first charge and discharge performance and cycle stability, and the service life of the lithium ion battery can be prolonged.

15 Claims, 1 Drawing Sheet

(51) Int. Cl.
    H01M 4/48        (2010.01)
    H01M 4/587       (2010.01)
    H01M 10/0525     (2010.01)
    H01M 4/02        (2006.01)
(52) U.S. Cl.
    CPC .. H01M 10/0525 (2013.01); *H01M 2004/021* (2013.01); *H01M 2004/027* (2013.01)

(58) Field of Classification Search
    CPC ..... H01M 2004/021; H01M 2004/027; H01M 4/0471; H01M 4/1393; H01M 4/1395; H01M 4/362; H01M 4/625; H01M 4/366; Y02E 60/10; B82Y 30/00
    See application file for complete search history.

(56) References Cited

FOREIGN PATENT DOCUMENTS

| CN | 102769139 | 11/2012 |
| CN | 103258988 | 8/2013 |
| CN | 103367727 | 10/2013 |
| CN | 104852019 | 8/2015 |
| CN | 105489866 | 4/2016 |
| CN | 106229486 | 12/2016 |
| CN | 106299322 | 1/2017 |

OTHER PUBLICATIONS

Lu, L., et al.; "Quantitative X-Ray Diffraction Analysis and Its Application to Various Coals"; Carbon 39 (2001); Aug. 20, 2001; 13 pages.

Manoj, B., et al.; "Study of Stacking Structure of Amorphous Carbon by X-Ray Diffraction Technique"; Int. J. Electrochem. Sci., 7 (2012); Apr. 1, 2012; 9 pages.

SILICON-CARBON COMPOSITE MATERIAL AND PREPARATION METHOD AND USE THEREOF

PRIORITY CLAIM

This application is a national stage application, filed under 35 U.S.C. § 371, of International Patent Application No. PCT/CN2018/100252, filed on Aug. 13, 2018, which claims the benefit of priority of Chinese Patent Application No. 20181048095.1, filed on May 18, 2018, both of which are incorporated by reference herein in their entirety.

FIELD

The present disclosure relates to the field of carbonaceous composite materials, in particular to a silicon-carbon composite material and a preparation method and a use thereof.

BACKGROUND

In the field of lithium ion batteries, graphite materials are currently the main anode materials for commercial lithium ion batteries due to its characteristics of high electronic conductivity, large lithium ion diffusion coefficient, small volume change of a laminated structure before and after lithium intercalation, high lithium intercalation capacity, low lithium intercalation potential and the like.

With the development of anode materials for commercial lithium ion batteries, silicon is considered as the most potential anode material for replacing graphite materials due to its specific lithium storage capacity as high as 4,200 mAh/g. However, the silicon anode material has a serious problem of volume expansion, which not only causes particle breakage of the silicon anode, but also seriously affects the cycle performance of the silicon anode material. In order to solve the problem of large volume expansion of the silicon material, a silicon/carbon composite material has been developed at present, wherein the graphite material has a buffering effect on the volume change of the silicon material in the circulation process, such that the circulation performance of the silicon material is improved.

CN102394288A discloses a silicon-carbon cathode material for a lithium ion battery and a manufacturing method thereof. The silicon-carbon cathode material comprises a silicon-carbon composite material and graphite powder, wherein the silicon-carbon composite material is consisting of nanometer silicon powder coated with a carbon material, the silicon-carbon cathode material specifically comprises the following components: nanometer silicon powder, carbon material precursor and the graphite powder; wherein the nanometer silicon powder is the elemental silicon powder with a particle size of 10-500 nm, and the graphite powder has a particle size of 0.5-50 μm. The preparation method of the silicon-carbon negative electrode material comprises the following steps: 1) stirring the nanometer silicon powder and the carbon material precursor of the wrapping layer in a solvent and drying the mixture to obtain a compound 1; 2) subjecting the compound 1 to heat treatment and crushing to obtain a silicon composite material; 3) washing, filtering, drying and crushing the silicon composite material to obtain a silicon-carbon composite material 1; 4) stirring the silicon-carbon composite material 1 and the carbon material precursor of the wrapping layer in a solvent, and drying the mixture to obtain a composite 2; 5) subjecting the compound 2 to heat treatment and crushing to obtain a silicon-carbon composite material 2; 6) uniformly mixing the crushed silicon-carbon composite material 2 with graphite powder. The preparation method has complex and tedious process, requires a plurality of mixing and carbonizing steps, and cannot realize the nano-scale mixing of the silicon-carbon material and the graphite material.

CN102769139A discloses a preparation method of a high-capacity lithium ion battery cathode silicon-carbon composite material, the preparation comprises the following steps: performing expansion treatment in regard to the natural spherical graphite at high temperature to obtain micro-expanded graphite, subjecting the micro-expanded graphite and the nanometer silicon powder to ultrasonic dispersion in water, performing suction filtration and drying to obtain the micro-expanded graphite with the nanometer silicon powder inserted between layers, mixing and coating the micro-expanded graphite with a carbon source precursor, and performing carbonization and sintering. The method does not realize uniform dispersion and effective insertion of the nano-silicon particles into the graphite sheet layer, and the prepared cathode material has a poor cycle performance and a low first coulomb efficiency.

CN103367727A discloses a lithium ion battery silicon-carbon anode material and a preparation method thereof. The anode material comprises nanometer silicon, graphite polymer and organic matter pyrolysis carbon, wherein the graphite polymer is formed by granular graphite, the nanometer silicon is embedded and clamped among gaps of the granular graphite or attached on the surface of the granular graphite; nanometer silicon/graphite polymer is covered by the organic matter pyrolysis carbon. A preparation method of the lithium ion battery silicon-carbon anode material comprises the following steps: mixing the nanometer silicon, a dispersing agent, a bonding agent and the granular graphite in an organic solvent, and drying the mixture to obtain composite nanometer silicon/graphite polymer; adding the obtained composite nanometer silicon/graphite polymer into the dispersion liquid of a carbon source precursor, mixing and drying the mixture; and carrying out heat treatment to obtain the lithium ion battery silicon-carbon anode material. The preparation method uses a large amount of organic solvent, which brings about safety problems during the operation process, and the method does not achieve nano-scale dispersion of additive graphite.

In order to overcome the above defects, it is necessary to develop a novel silicon-carbon composite material and a method for preparing the same.

SUMMARY

The present disclosure aims to provide a silicon-carbon composite material and a preparation method and a use thereof. The silicon-carbon composite material provided by the present disclosure can be used as a lithium ion battery anode material to effectively improve the electrochemical performance of the lithium ion battery.

According to a first aspect, the present disclosure provides a silicon-carbon composite material comprising a composite carbon material and nanometer silicon dispersed therein, the composite carbon material is consisting of a graphitic crystal phase and an amorphous carbon phase, wherein the ratio $I_{002}/I_{amor}$, of the peak intensity $I_{002}$ of the graphite crystal phase (002) plane relative to the peak intensity $I_{amor}$ of the amorphous carbon phase as measured by the X-Ray Diffraction (XRD) is within a range of 0.1-40, and the content of the graphite crystal phase in the composite carbon material is not less than 5 wt %.

According to a second aspect, the present disclosure provides a method of preparing the silicon-carbon composite material, and the method comprises the following steps:

1) subjecting the raw materials consisting of a matrix material, a filler and the nanometer silicon to multi-stage mixing so as to obtain a mixture product, wherein the multi-stage mixing comprises:

(1) mixing the raw materials under an ambient temperature for 1-6 hours; then (2) blending the raw materials for 0.5-3 hours in the process of heating to 10-50° C. higher than the softening temperature of the matrix material; then (3) blending the raw materials for 2-10 hours at the constant temperature of 10-50° C. higher than the softening temperature of the matrix material; and then (4) blending the raw materials for 0.5-3 hours in the process of cooling to the ambient temperature;

circulating the stages (1) to (4) for multiple times, and the total time of the multi-stage mixing is within a range of 10-150 hours;

2-1) oxidizing the mixture product, and subsequently carrying out carbonization in a carbonization furnace; or 2-2) subjecting the mixture product to the mould pressing carbonization in a mould;

the matrix material forms the amorphous carbon phase by carbonization, and the filler is selected from graphite and/or graphene.

According to a third aspect, the present disclosure provides a silicon-carbon composite material produced with the method of the second aspect of the present disclosure.

According to a fourth aspect, the present disclosure provides a method of using the silicon-carbon composite material according to the first aspect or third aspect of the present disclosure in a lithium ion battery.

The method of the present disclosure can realize the uniform dispersion of graphite in the matrix with the nanoscale thickness. In addition, the silicon-carbon composite material of the present disclosure is used as an anode material of the lithium ion battery, so that the lithium ion battery has desirable first charge and discharge performance and cycle stability, and the service life of the lithium ion battery can be effectively prolonged.

DETAILED DESCRIPTION

Figure 1:
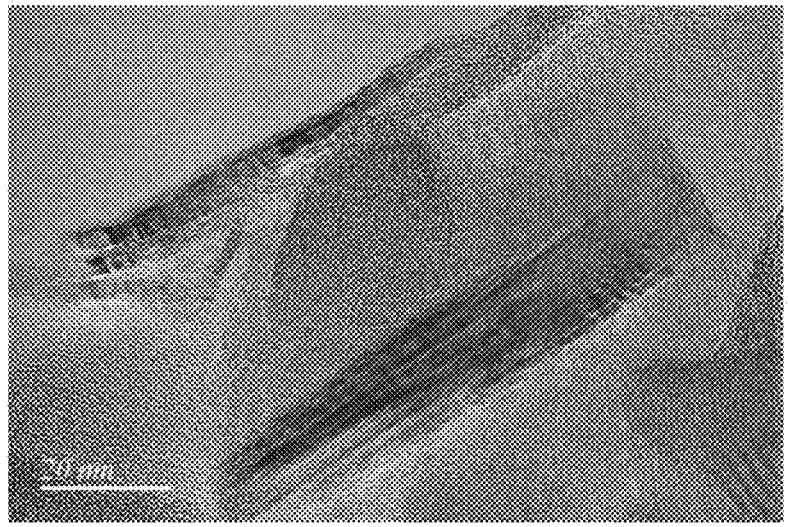
FIG. 1 illustrates a High Resolution Transmission Electron Microscopy (HR-TEM) image of the silicon-carbon composite material prepared in Example 5.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

According to a first aspect, the present disclosure provides a silicon-carbon composite material comprising a composite carbon material and nanometer silicon dispersed therein.

The composite carbon material is consisting of a graphitic crystal phase and an amorphous carbon phase, wherein the ratio $I_{002}/I_{amor}$ of the peak intensity $I_{002}$ of the graphite crystal phase (002) plane relative to the peak intensity $I_{amor}$ of the amorphous carbon phase as measured by the X-Ray Diffraction (XRD) is within a range of 0.1-40, and the content of the graphite crystal phase in the composite carbon material is not less than 5 wt %.

In the present disclosure, the content of the graphite crystal phase is determined according to the feeding amount in the preparation of the silicon-carbon composite material.

In the silicon-carbon composite material of the present disclosure, the peak intensity $I_{002}$ of the graphite crystal phase (002) plane and the peak intensity $I_{amor}$ of the amorphous carbon phase are measured by the following conventional methods: carrying out XRD detection in regard to the powder sample to obtain an XRD spectrogram and XRD data of the sample, using the Topas software for automatically deducting the background, carrying out peak-differentiation-fitting so as to obtain a peak of a graphite crystal phase (002) plane and a peak of an amorphous carbon phase, and reading the corresponding intensities.

In the silicon-carbon composite material of the present disclosure, the ratio $I_{002}/I_{amor}$ of the peak intensity $I_{002}$ of the graphite crystal phase (002) plane relative to the peak intensity $I_{amor}$ of the amorphous carbon phase is preferably within a range of 0.5-37, and more preferably 1.5-37.

In the silicon-carbon composite material of the present disclosure, the normalized ratio $I_{002}/I_{amor}$ of the peak intensity $I_{002}$ of the graphite crystal phase (002) plane relative to the peak intensity $I_{amor}$ of the amorphous carbon phase may be within a range of 0.1-60.

It shall be comprehended by those skilled in the art that the normalized ratio $I_{002}/I_{amor}$ can circumvent the influences of the content of different components of the material on the intensity ratio.

In the present disclosure, the normalized ratio $I_{002}/I_{amor}$ is determined according to Formula (1):

$$\text{Normalized ratio } I_{002}/I_{amor}=(I_{002}/Wf_G)/(I_{amor}/Wf_D) \quad \text{Formula (1)}$$

Wherein $Wf_G$ represents the mass percentage of the filler (for forming a graphite crystal phase) used in the preparation of the silicon-carbon composite material relative to the sum of the filler and the matrix material (for forming an amorphous carbon phase);

$Wf_D$ represents the mass percentage of the matrix material used in the preparation of the silicon-carbon composite material in the total of the filler and the matrix material.

According to the silicon-carbon composite material of the present disclosure, the normalized ratio $I_{002}/I_{amor}$ of the peak intensity $I_{002}$ of the graphite crystal phase (002) plane relative to the peak intensity $I_{amor}$ of the amorphous carbon phase is preferably within a range of 3-50, more preferably 3-45.

According to the silicon-carbon composite material of the present disclosure, the ratio $I_{002}$/FWHM of the peak intensity $I_{002}$ of the graphite crystal phase (002) plane relative to the full width at half maximum (FWHM) of the peak, as measured by XRD, is within a range of 1,000-80,000. Wherein the ratio $I_{002}$/FWHM reflects the characteristic of the peak of the graphite crystal phase (002) plane in the XRD diffraction spectrum.

The ratio $I_{002}$/FWHM of the peak intensity $I_{002}$ of the graphite crystal phase (002) plane relative to the full width at half maximum (FWHM) of the peak is preferably within a range of 3,000-60,000, further preferably 4,000-55,000.

According to the silicon-carbon composite material of the present disclosure, the dispersion coefficient δ of the ratio Id/Ig of Id and Ig as measured by Raman spectrum is less than 0.8. The dispersion coefficient δ indicates a very uniform dispersion between the graphitic crystalline phase and the amorphous carbon phase.

In the present disclosure, the dispersion coefficient δ is determined by means of the following steps:

I: determining values Id and Ig of the Raman spectrum at 20 different locations in the sample;

II: calculating value Id/Ig of the 20 positions and marking the values as $\mu_1, \mu_2, \ldots, \mu_{20}$, respectively, and calculating the average value μ according to a Formula (2):

$$\mu=(\mu_1+\mu_2+\ldots+\mu_{20})/20, \quad \text{Formula (2)}$$

III: calculating the standard deviation σ according to a Formula (3):

$$\sigma=\text{sqrt}\{[(\mu_1-\mu)^2+(\mu_2-\mu)^2+\ldots+(\mu_n-\mu)^2]/n\}, \quad \text{Formula (3)}$$

Wherein the symbol sqrt represents a square root;

IV: calculating the dispersion coefficient δ according to a Formula (4):

$$\delta=\sigma/\mu, \quad \text{Formula (4).}$$

In the silicon-carbon composite material, the dispersion coefficient δ is preferably within a range of 0.1-0.5.

According to the silicon-carbon composite material, the graphite crystal phase is dispersed in the amorphous carbon phase in a nano-scale thickness, and the thickness of the graphite crystal phase may be generally within a range of 1-40 nm, preferably 5-30 nm, and more preferably 5-25 nm.

In the present disclosure, the thickness of the graphite crystal phase is measured by the High Resolution Transmission Electron Microscopy (HR-TEM).

According to an embodiment, in the silicon-carbon composite material, the graphite interlayer spacing $d_{002}$ of the graphite crystal phase (002) plane as measured by XRD is within a range of 0.335-0.345 nm, and the crystal grain size Lc of the c-axis crystal plane of the graphite crystal phase is within a range of 5-35 nm, preferably 10-28.5 nm.

The present disclosure does not impose specific definition in regard to the type and content of the nanometer silicon, the type and content can be determined according to those of the existing silicon-carbon anode material. Generally, the content of the nanometer silicon in the silicon-carbon composite material may be within a range of 1-50 wt %. When the silicon-carbon composite material is used as an anode material of a lithium ion battery, in order to further enable the lithium ion battery to have high charge capacity and cycle stability, the content of the nanometer silicon in the silicon-carbon composite material is preferably within a range of 5-40 wt %, and more preferably 15-40 wt %.

In the present disclosure, the nanometer silicon can be selected from nanometer silicon powder and/or nanometer silicon monoxide. The median particle diameter ($D_{50}$) of the nanometer silicon may be within a range of 1-200 nm, and preferably 30-150 nm.

In the present disclosure, the content of the nanometer silicon is determined according to the feeding amount of the nanometer silicon during the preparation of the silicon-carbon composite material, and the median particle diameter of the nanometer silicon refers to the median particle diameter of the nanometer silicon adopted during the process of preparing the silicon-carbon composite material.

According to an embodiment, the true density ρ of the silicon-carbon composite material within a range of 1.8-2.3 g/cm³.

According to a second aspect, the present disclosure provides a method of preparing the silicon-carbon composite material, and the method comprises the following steps:

1) subjecting the raw materials consisting of a matrix material, a filler and the nanometer silicon to multi-stage mixing so as to obtain a mixture product, wherein the multi-stage mixing comprises:

(1) mixing the raw materials under an ambient temperature (15-45° C.) for 1-6 hours; then (2) blending the raw materials for 0.5-3 hours in the process of heating to 10-50° C. higher than the softening temperature of the matrix material; then (3) blending the raw materials for 2-10 hours at the constant temperature of 10-50° C. higher than the softening temperature of the matrix material; and then (4) blending the raw materials for 0.5-3 hours in the process of cooling to the ambient temperature;

circulating the stages (1) to (4) for multiple times, and the total time of the multi-stage mixing is within a range of 10-150 hours;

2-1) oxidizing the mixture product, and subsequently carrying out carbonization in a carbonization furnace; or 2-2) subjecting the mixture product to the mould pressing carbonization in a mould;

the matrix material forms the amorphous carbon phase by carbonization, and the filler is selected from graphite and/or graphene.

The matrix material is not particularly limited in the present disclosure as long as it can form the amorphous carbon phase after carbonization. Typically, the matrix material may be at least one selected from the group consisting of petroleum asphalt, coal pitch, mesophase pitch, Direct Coal Liquefaction Residue (DCLR), heavy aromatic hydrocarbons, epoxy resins, phenolic resins, urea-formaldehyde resins, furfural resins, polyvinyl alcohol, polyethylene glycol, polyvinylidene fluoride and polyacrylonitrile.

The softening temperature herein is defined according to the kind of the matrix material, it refers to a temperature at which the matrix material can flow, for example, when the matrix material is selected from the above-mentioned asphalts or thermosetting resins, the softening temperature refers to its softening point; when the matrix material is the above-mentioned thermoplastic resin, the softening temperature refers to its melting point.

Preferably, the matrix material is at least one of petroleum asphalt, coal pitch and mesophase pitch. The softening point of the coal pitch may be within a range of 80-360° C., preferably 100-320° C.; the softening point of the petroleum asphalt may be within a range of 80-360° C., preferably 100-320° C.; the softening point of the mesophase pitch may be within a range of 180-360° C. In addition, the mesophase content in the mesophase pitch is usually within a range of 30-100 vol %.

According to the method of the present disclosure, the graphite, graphene as a filler is utilized to form a graphite crystal phase in the silicon-carbon composite material. Wherein the graphite may be one or more selected from the group consisting of natural graphite, artificial graphite, expanded graphite and graphite oxide. Typically, the carbon content in the graphite is 90 wt % or more. The number of graphene layers is preferably 20 or less.

According to a preferred embodiment, the matrix material in step 1) is at least one selected from the group consisting of coal pitch, petroleum asphalt and mesophase pitch. The mixture raw material composed of the matrix material, the filler and the nanometer silicon is prepared by blending the matrix material, the filler and the nanometer silicon in a blender mixer for 1-16 hours. The blending temperature in the mixer is not particularly limited in the present disclosure, it can be selected with reference to the prior art, for example, the blending is carried out at an ambient temperature.

More preferably, both the matrix material and the filler are blended in the blender mixer in particulate form. The mesh number of the matrix material is more than 50 meshes (i.e., 270 μm pore size screen underflow), and more preferably 100-300 meshes. For example, the asphalt particles as the matrix material have a particle size of −50 meshes, −100 meshes (i.e., 150 μm pore size screen underflow), −150 meshes (106 μm pore size screen underflow), −200 mesh (75 μm pore size screen underflow), −300 mesh (48 μm pore size screen underflow). The asphalt having the particle size may be commercially available, or may be obtained by pulverizing and sieving in advance.

The mesh number of the filler is more than 80 meshes (i.e., 180 μm pore size screen underflow), and preferably 80-200 meshes. For example, the filler particles have a particle size of −100 meshes, −150 meshes, −200 meshes. The morphology of the filler is not particularly limited in the present disclosure, it may have any geometric shape, such as, but not limited to, spherical, sheet-shaped, cylindrical, polyhedral and the like. The filler having the above particle size may be commercially available, or may be prepared by pulverizing and sieving in advance.

According to the method of the present disclosure, the matrix material and the filler in step 1) are used in such an amount that the content of the graphite crystal phase (i.e., filler) in the resulting silicon-carbon composite material is not less than 5 wt %, based on the total weight of the silicon-carbon composite material. Typically the mass ratio of matrix material to filler may be 1:0.1-5, preferably 1:0.25-2.

In the step 1), the multi-stage mixing is performed by adjusting the temperature stepwise during the mixing process. It should be comprehended by those skilled in the art that the stage (2) "blending the matrix material and the filler for 0.5-3 hours in the process of heating to 10-50° C. higher than the softening temperature of the matrix material" means that the ambient temperature is used as the starting temperature, the temperature is gradually raised to a temperature of 10-50° C. higher than the softening temperature of the matrix material, which may be regarded as the final temperature of the step during the mixing process, and the temperature rise process of the step takes 0.5-3 hours; the stage (4) "blending the matrix material and the filler for 0.5-3 hours in the process of cooling to the ambient temperature" means that the process of gradually cooling from the constant temperature of the stage (3) to the ambient temperature takes a total of 0.5-3 hours during the mixing process.

In the present disclosure, the temperature rise in the stage (2) is preferably a temperature rise with an constant speed, and the temperature reduction in the stage (4) is preferably a temperature reduction with an constant speed.

In the step 1), the multi-stage mixing is performed by means of one of ball milling, blending-kneading and banburying or a combination thereof. The multi-stage mixing can be carried out under protection of an inert atmosphere or under vacuum conditions.

The inert atmosphere is, for example, at least one selected from the group consisting of nitrogen gas, argon gas, helium gas, neon gas and krypton gas.

In the step 1), the mixing process is performed sequentially according to the four stages, namely stage (1), stage (2), stage (3) and stage (4), the four stages form a cycle, and the cycle is circulated for a plurality of times, for example, the number of circulations is 2-9 times (i.e., the mixing is performed for 3-10 times). Preferably, the total time of the multi-stage mixing is within a range of 50-130 hours.

According to a preferred embodiment, the mixing is carried out by means of ball milling, the rotation speed of the ball mill may be controlled within a range of 100-1,000 rpm, preferably 300-800 rpm; the revolution speed may be controlled within a range of 50-400 rpm, preferably 100-400 rpm.

According to another preferred embodiment, the mixing is performed by the blending-kneading, and the rotation speed of the kneader is preferably within a range of 50-500 rpm, more preferably 200-500 rpm.

According to a further preferred embodiment, the mixing is carried out by banburying, the rotation speed of the banbury mixer is preferably within a range of 50-500 rpm, more preferably 200-500 rpm.

In the step 2-1), the operation of oxidation and the conditions thereof are not particularly limited in the present disclosure, both may be selected by referring to the prior art.

According to one embodiment, the oxidation is performed in an oxidizing atmosphere, the temperature of the oxidation may be within a range of 220-350° C., and the oxidation time may be within a range of 1-16 hours, preferably 5-12 hours. The oxidizing atmosphere is, for example, air or oxygen.

According to another embodiment, the oxidation is performed in a strong oxidizing acid, the temperature of the oxidation may be within a range of 25-100° C., and the oxidation time may be within a range of 0.5-12 hours. The examples of the strong oxidizing acid include concentrated nitric acid, a mixture of concentrated nitric acid and concentrated sulfuric acid (e.g., a mixture of concentrated nitric acid and concentrated sulfuric acid in a volume ratio of 1:3), and a mixture of concentrated nitric acid and concentrated hydrochloric acid (e.g., aqua regia). Preferably, the strong oxidizing acid is concentrated nitric acid.

In the embodiment, step 2-1) may further include: washing the product obtained by oxidation with water to be neutral (pH is 6-8) and drying the washed product before carbonization.

It shall be comprehended by those skilled in the art that the purpose of the oxidation treatment is to obtain a product that is no longer meltable. The term "no longer meltable" has the general meaning in the field of carbon-based composite material production, and means that the product obtained by oxidation treatment does not soften or have fluidity under any heating conditions.

In the step 2-1), the carbonization is performed in a carbonization furnace, and the carbonization temperature may be within a range of 600-1,600° C., preferably 750-1,450° C.; the carbonization time may be within a range of 1-10 hours, preferably 1-8 hours.

In the step 2-2), the carbonization temperature in the mould pressing carbonization may be within a range of 600-1,600° C., preferably 750-1,450° C., and the pressure applied to the surface of the mixture may be within a range of 10-50 MPa, preferably 10-40 MPa; the carbonization time may be within a range of 1-10 hours, preferably 1-8 hours.

In step 2-1) and step 2-2), the carbonization is generally performed under protection of an inert atmosphere. The inert atmosphere is as described above and the content is not repeated here.

According to the method of the present disclosure, when the silicon-carbon composite material is used as an anode material of a lithium ion battery, it is preferable that the method further comprises:

3) subjecting the carbonized product obtained in step 2-1) or step 2-2) (i.e., the silicon-carbon composite material of the present disclosure) to pulverization and grading. Preferably, the median particle diameter of the powder obtained by this step is within a range of 5-20 μm.

The pulverization may be performed by a ball mill or a jet mill.

According to a third aspect, the present disclosure provides a silicon-carbon composite material produced with the method.

According to a fourth aspect, the present disclosure provides a use of the silicon-carbon composite material in a lithium ion battery.

According to the use of the present disclosure, the silicon-carbon composite material provided by the present disclosure can be used as an anode material of a lithium ion battery, such that the lithium ion battery has desirable first charge and discharge performance and cycle stability, and the service life of the lithium ion battery can be prolonged.

The present disclosure will be described in detail below with reference to examples.

In the following examples and comparative examples,
1. Device
1) The banbury mixer was purchased from Dongguan Lixian Instrument Technology Co., Ltd., with the model number HZ-7048;
2) The kneader was a Thermo Scientific™ purchased from Thermo Fisher Scientific Inc., with the model number HAAKE PolyLab Rheomex 600 OS;
3) The ball mill was purchased from Changshan MeaSure Instruments Equipment Co., Ltd., with the model number QM-QX 2L;
4) The blender mixer was purchased from Wuxi Xinguang Powder Technology Co., Ltd., with the model number VCH-5;
5) The jet mill was purchased from Weifang Aipa Powder Technology Equipment Co., Ltd., with the model number MQW 03.

2. The softening points of asphalts were measured according to D 3104-99 Standard Test Method for Softening Point of Pitches as stipulated by the American Society for Testing Material (ASTM).

3. Characterization of silicon-carbon composite material.
1) Testing the true density: the true density was measured by the true densitometer AccuPyc® II 1340 manufactured by the Micrometrics Instrument Corporation in USA at the temperature of 25° C.
2) XRD test: the test was carried out by a D8 ADVANCE X-ray diffractometer manufactured by the Bruker AXS GmbH in Germany, with copper Kα radiation over a scanning angle range of 10-90° and a step of 0.02.
3) TEM test: the sample was ground into a fine powder, loaded on a copper mesh, and measured by a JEM 2100 High Resolution Transmission Electron Microscope (HR-TEM) manufactured by the JEOL Ltd. in Japan.
4) SEM test: the dispersion condition of nanometer silicon in the material was observed by the back-scattered electron (BSE) images using a scanning electron microscope manufactured by the FEI Company in the Czech Republic, with a model number Nova NanoSEM 450.
5) Raman spectrum: the testing was performed by a LabRam HR-800 microscopy laser confocal Raman spectrometer manufactured by the Horiba Jobin Yvon S.A.S in France, wherein the laser wavelength was 532.06 nm, the slit width was 100 μm, the scanning range was 700-2,100 cm$^{-1}$, values Id and Ig were obtained through the Raman spectrum analysis;

Wherein the powder sample of the material to be tested was flatly laid in a sample pool, 20 randomly distributed points in the sample were respectively measured to obtain the corresponding Id/Ig values; the dispersion coefficient δ of the Id/Ig values was then calculated according to the previously mentioned calculation method.

4. Lithium ion Battery Property test (first week charge capacity, first week coulomb efficiency and 50-cycle capacity conservation rate)

The test was performed with a battery test system LAND CT2001A manufactured by the Wuhan LAND Electronic Co., Ltd., the charging and discharging voltage range was 0-3V, and the test was carried out under the current density of 0.1C; wherein the 50-time cycle capacity retention rate refers to the ratio of the 50-week charging capacity relative to the first-week charging capacity of the battery.

Examples 1-6 were provided to illustrate the silicon-carbon composite material and the method of preparing the same according to the present disclosure.

Example 1

The petroleum asphalt with a softening point of 150° C. was used as a matrix material, the asphalt was subjected to crushing and the crushed asphalt was subjected to sieving by a 150-mesh sieve, the obtained screen underflow particles and the natural graphite (150-mesh sieve screen underflow particles, with a carbon content more than or equal to 99.5 wt %) and the nanometer silicon powder ($D_{50}$=30 nm) were subjected to blending for 4 hours in a blender mixer at an ambient temperature according to a mass ratio of 4:1:1, so as to obtain the mixture raw material.

The mixture raw material was added into a kneader, the mixture raw material was initially processed at an ambient temperature for 3 hours at a rotation speed of 300 rpm under the protection of nitrogen gas, and then processed for 1 hour in the process of heating to 160° C. at a constant speed, and subsequently processed at a constant temperature of 160° C. for 6 hours, the mixture raw material was finally processed for 1 hour in the process of cooling to an ambient temperature at a constant speed, the process was circulated for 8 times, and the mixture raw material was subjected to blending-kneading in a total of 88 hours.

The mixture obtained by blending-kneading was placed in a mould and heated to 750° C. under the protection of nitrogen gas, and a pressure of 10 MPa was applied to the surface of the mixture, the temperature and pressure were kept for 1 hour, and then cooled, thereby obtaining a silicon-carbon composite material A-1. The characterization results of the silicon-carbon composite material were shown in Table 1.

Example 2

The coal pitch with a softening point of 200° C. was used as a matrix material, the pitch was subjected to crushing and the crushed asphalt was subjected to sieving by a 200-mesh sieve, the obtained screen underflow particles and the artificial graphite (200-mesh sieve screen underflow particles, with a carbon content more than 99 wt %) and the nanometer silicon monoxide ($D_{50}$=30 nm) were subjected to blending for 6 hours in a blender mixer at an ambient temperature according to a mass ratio of 3:2:2, so as to obtain the mixture raw material.

The mixture raw material was added into a ball mill, the mixture raw material was initially subjected to ball milling at an ambient temperature for 3 hours at the rotation speed of 800 rpm and the revolution speed of 200 rpm under the protection of argon gas, and then subjected to ball milling for 2 hours in the process of heating to 240° C. at a constant speed, and subsequently subjected to ball milling at a constant temperature of 240° C. for 8 hours, the mixture raw material was finally subjected to ball milling for 2 hours in the process of cooling to an ambient temperature at a constant speed, the process was circulated for 7 times, and the mixture raw material was subjected to ball milling in a total of 105 hours.

The mixture obtained by ball milling was placed in a mould and heated to 750° C. under the protection of nitrogen gas, and a pressure of 10 MPa was applied to the surface of the mixture, the temperature and pressure were kept for 4 hours, and then cooled, thereby obtaining a silicon-carbon composite material A-2. The characterization results of the silicon-carbon composite material were shown in Table 1.

Example 3

The coal pitch with a softening point of 180° C. was used as a matrix material, the pitch was subjected to crushing and the crushed asphalt was subjected to sieving by a 300-mesh sieve, the obtained screen underflow particles and the artificial graphite (300-mesh sieve screen underflow particles, with a carbon content more than 99 wt %) and the nanometer silicon powder ($D_{50}$=120 nm) were subjected to blending for 4 hours in a blender mixer at an ambient temperature according to a mass ratio of 1:1:0.5, so as to obtain the mixture raw material.

The mixture raw material was added into a kneader, the mixture raw material was initially processed at an ambient temperature for 3 hours at the rotation speed of 500 rpm under the protection of nitrogen gas, and then processed for 1 hour in the process of heating to 200° C. at a constant speed, and subsequently processed at a constant temperature of 200° C. for 6 hours, the mixture raw material was finally processed for 1 hour in the process of cooling to an ambient temperature at a constant speed, the process was circulated for 6 times, and the mixture raw material was subjected to blending-kneading in a total of 66 hours.

The mixture obtained by blending-kneading was placed in a an oxidation furnace and subjected to treating for 10 hours at 220° C. in an air atmosphere; the obtained oxidation product was then put into a carbonization furnace and subjected to carbonization at 1400° C. for 3 hours under the protection of nitrogen gas, and then cooled, thereby obtaining a silicon-carbon composite material A-3. The characterization results of the silicon-carbon composite material were shown in Table 1.

Example 4

The mesophase pitch (having a mesophase content of 60 vol %) with a softening point of 280° C. was used as a matrix material, the pitch was subjected to crushing and the crushed asphalt was subjected to sieving by a 100-mesh sieve, the obtained screen underflow particles and a mixture of the expanded graphite and the natural graphite (the mass ratio of the expanded graphite to the natural graphite was 1:2, both the expanded graphite and the natural graphite were 100-mesh screen underflow particles, with a carbon content more than 99 wt %) and the nanometer silicon monoxide ($D_{50}$=80 nm) were subjected to blending for 10 hours in a blender mixer at an ambient temperature according to a mass ratio of 1:2:2, so as to obtain the mixture raw material.

The mixture raw material was added into a ball mill, the mixture raw material was initially subjected to ball milling at an ambient temperature for 3 hours at a rotation speed of 600 rpm and a revolution speed of 400 rpm under the protection of nitrogen gas, and then subjected to ball milling for 3 hour in the process of heating to 300° C. at a constant speed, and subsequently subjected to ball milling at a constant temperature of 300° C. for 10 hours, the mixture raw material was finally subjected to ball milling for 3 hours in the process of cooling to an ambient temperature at a constant speed, the process was circulated for 4 times, and the mixture raw material was subjected to ball milling in a total of 76 hours.

The mixture obtained by ball milling was placed in a mould and heated to 1,450° C. under the protection of nitrogen gas, and a pressure of 20 MPa was applied to the surface of the mixture, the temperature and pressure were kept for 4 hours, and then cooled, thereby obtaining a silicon-carbon composite material A-4. The characterization results of the silicon-carbon composite material were shown in Table 1.

Example 5

The petroleum asphalt with a softening point of 220° C. was used as a matrix material, the asphalt was subjected to crushing and the crushed asphalt was subjected to sieving by a 200-mesh sieve, the obtained screen underflow particles and the natural graphite (200-mesh sieve screen underflow particles, with a carbon content more than or equal to 99.5 wt %) and the nanometer silicon powder ($D_{50}$=100 nm) were subjected to blending for 8 hours in a blender mixer at an ambient temperature according to a mass ratio of 4:1:2, so as to obtain the mixture raw material.

The mixture raw material was added into a banbury mixer, the mixture raw material was initially processed at an ambient temperature for 3 hours at a rotation speed of 300 rpm under the protection of nitrogen gas, and then processed for 2 hours in the process of heating to 250° C. at a constant speed, and subsequently processed at a constant temperature of 250° C. for 8 hours, the mixture raw material was finally processed for 2 hours in the process of cooling to an ambient temperature at a constant speed, the process was circulated for 6 times, and the mixture raw material was subjected to banburying in a total of 90 hours.

The mixture obtained by banburying was placed in concentrated nitric acid and subjected to treating at 60° C. for 2 hours, then subjected to filtering, the obtained filter cake was washed with deionized water until the pH of the obtained solution was 7, and the filter cake was finally subjected to forced air drying at 100° C. to obtain an oxidation product, the obtained oxidation product was subsequently placed into a carbonization furnace, and subjected to carbonization treatment at 1,300° C. for 3 hours under the protection of nitrogen gas, and then cooled to obtain the silicon-carbon composite material A-5. The characterization results of the silicon-carbon composite material were shown in Table 1.

Example 6

The petroleum asphalt with a softening point of 150° C. was used as a matrix material, the asphalt was subjected to crushing and the crushed asphalt was subjected to sieving by a 150-mesh sieve, the obtained screen underflow particles and the natural graphite (150-mesh sieve screen underflow particles, with a carbon content more than or equal to 99.5 wt %) and the nanometer silicon powder ($D_{50}$=30 nm) were subjected to blending for 7 hours in a blender mixer at an ambient temperature according to a mass ratio of 1:1:0.2, so as to obtain the mixture raw material.

The mixture raw material was added into a banbury mixer, the mixture raw material was initially processed at an ambient temperature for 1 hour at a rotation speed of 500 rpm under the protection of nitrogen gas, and then processed for 1.8 hours in the process of heating to 190° C. at a constant speed, and subsequently processed at a constant temperature of 190° C. for 4 hours, the mixture raw material was finally processed for 1.2 hours in the process of cooling to an ambient temperature at a constant speed, the process was circulated for 4 times, and the mixture raw material was subjected to banburying in a total of 32 hours.

The mixture obtained by banburying was placed in a mould and heated to 850° C. under the protection of nitrogen gas, and a pressure of 20 MPa was applied to the surface of the mixture, the temperature and pressure were kept for 1 hour, and then cooled, thereby obtaining a silicon-carbon composite material A-6. The characterization results of the silicon-carbon composite material were shown in Table 1.

Comparative Example 1

The petroleum asphalt with a softening point of 220° C. was used as a matrix material, the asphalt was subjected to crushing and the crushed asphalt was subjected to sieving by a 200-mesh sieve, the obtained screen underflow particles, the natural graphite (200-mesh sieve screen underflow particles, with a carbon content more than or equal to 99.5 wt %) and the nanometer silicon powder ($D_{50}$=100 nm) were subjected to blending for 8 hours in a blender mixer at an ambient temperature according to a mass ratio of 4:1:2, so as to obtain the mixture raw material.

The mixture raw material was added into a kneader, subjected to blending-kneading at an ambient temperature for 90 hours at a rotation speed of 500 rpm.

The mixture obtained by blending-kneading was placed in concentrated nitric acid, and subjected to treating at 60° C. for 2 hours, then subjected to filtering, the obtained filter cake was washed with deionized water until the pH of the obtained solution was 7, the washed filter cake was finally subjected to forced air drying at 100° C. to obtain an oxidation product; the obtained oxidation product was subsequently placed into a carbonization furnace, and subjected to carbonization treatment at 1,300° C. for 3 hours under the protection of nitrogen gas to obtain the silicon-carbon composite material B-1. The characterization results of the silicon-carbon composite material were shown in Table 1.

Comparative Example 2

The mesophase pitch (having a mesophase content of 60 vol %) with a softening point of 280° C. was used as a matrix material, the pitch was subjected to crushing and the crushed asphalt was subjected to sieving by a 100-mesh sieve, the obtained screen underflow particles, a mixture of the expanded graphite and the natural graphite (the mass ratio of the expanded graphite to the natural graphite was 1:2, both the expanded graphite and the natural graphite were 100-mesh screen underflow particles, with a carbon content more than 99 wt %) and the nanometer silicon monoxide ($D_{50}$=80 nm) were subjected to blending for 10 hours in a blender mixer at an ambient temperature according to a mass ratio of 1:2:2, so as to obtain the mixture raw material.

The mixture raw material was added into a ball mill, and initially subjected to ball milling at an ambient temperature for 15 hours at a rotation speed of 600 rpm and a revolution speed of 400 rpm under the protection of nitrogen gas, and then subjected to ball milling for 0.5 hour in the process of heating to 300° C. at a constant speed, and subsequently subjected to ball milling at a constant temperature of 300° C. for 0.5 hour, the mixture raw material was finally subjected to ball milling for 5 hours in the process of cooling to an ambient temperature at a constant speed, the process was circulated for 4 times, and the mixture raw material was subjected to ball milling in a total of 84 hours.

The mixture obtained by ball milling was placed in a mould and heated to 1,450° C. under the protection of nitrogen gas, and a pressure of 20 MPa was applied to the surface of the mixture, the temperature and pressure were kept for 4 hours, and then cooled, thereby obtaining a silicon-carbon composite material B-2. The characterization results of the silicon-carbon composite material were shown in Table 1.

Comparative Example 3

The petroleum asphalt with a softening point of 150° C. was used as a matrix material, the asphalt was subjected to crushing and the crushed asphalt was subjected to sieving by a 150-mesh sieve, the obtained screen underflow particles and the natural graphite (150-mesh sieve screen underflow particles, with a carbon content more than or equal to 99.5 wt %) and the nanometer silicon powder ($D_{50}$=30 nm) were subjected to blending for 7 hours in a blender mixer at an ambient temperature according to a mass ratio of 1:1:0.2, so as to obtain the mixture raw material.

The mixture raw material was added into a banbury mixer, the mixture raw material was initially processed at an ambient temperature for 1 hour at a rotation speed of 500 rpm under the protection of nitrogen gas, and then processed for 5 hours in the process of heating to 200° C. at a constant speed, and subsequently processed at a constant temperature of 200° C. for 12 hours, the mixture raw material was finally processed for 5 hours in the process of cooling to an ambient temperature at a constant speed, the process was circulated for 4 times, and the mixture raw material was subjected to banburying in a total of 92 hours.

The mixture obtained by banburying was placed in a mould and heated to 850° C. under the protection of nitrogen gas, and a pressure of 10 MPa was applied to the surface of the mixture, the temperature and pressure were kept for 1 hour, and then cooled, thereby obtaining a silicon-carbon composite material B-3. The characterization results of the silicon-carbon composite material were shown in Table 1.

The Application Examples 1-6 and Application Comparative Examples 1-3 were used for illustrating the application of the silicon-carbon composite materials of Examples 1-6 and Comparative Examples 1-3 on the lithium ion batteries, respectively.

Application Examples 1-6 and Application Comparative Examples 1-3

The silicon-carbon composite materials prepared in Examples 1-6 and Comparative Examples 1-3 were further pulverized and classified in a jet mill respectively to obtain silicon-carbon composite material powders (with the median particle diameter $D_{50}$ as shown in Table 2, respectively), the 9 kinds of powders were mixed with carbon black, Polyvinylidene Fluoride (PVDF) and N-methyl pyrrolidone (NMP) at a mass ratio of 92:3:5:200 respectively and stirred uniformly, so as to obtain a negative electrode slurry; the obtained negative electrode slurry was then coated on copper foil (with the thickness of 10 μm), the coated copper foil was subjected to drying in a vacuum oven at 120° C. and −0.08 MPa for 12 hours to obtain an anode for a lithium ion battery.

The anode for a lithium ion battery was subjected to punching, and assembled into button batteries in a glove box filled with argon gas, wherein the counter electrode was a metal lithium sheet, the electrolyte was selected from 1 mol/L EC+EMC solution of $LiPF_6$ (the volume ratio of EC to EMC was 1:1), and the diaphragm was a Celgard2400 diaphragm. The performance of the cell was shown in Table 2.

TABLE 1

| Items | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| $d_{0002}$ (nm) of crystal phase | 0.336 | 0.338 | 0.337 | 0.342 | 0.337 | 0.336 | 0.335 | 0.338 | 0.338 |
| Crystal phase crystalline grain size Lc (nm) | 23.2 | 17.6 | 28.4 | 15.8 | 16.5 | 19.2 | 124.2 | 89.3 | 32.1 |
| $I_{002}$/FWHM | 26,445 | 32,364 | 44,307 | 54,574 | 13,396 | 72,458 | 346,752 | 152,546 | 95,236 |
| $I_{002}/I_{amor}$ | 5.4 | 25.7 | 19.7 | 36.2 | 11.2 | 38.6 | 74.6 | 80.5 | 65.2 |
| Normalized $I_{002}/I_{amor}$ | 21.7 | 38.6 | 19.7 | 18.1 | 44.8 | 38.6 | 298.4 | 161 | 65.2 |
| Dispersion coefficient δ | 0.43 | 0.32 | 0.48 | 0.15 | 0.42 | 0.57 | 0.81 | 0.92 | 0.82 |
| True density ρ (g/cm³) | 2.024 | 2.152 | 2.184 | 2.241 | 1.956 | 2.214 | 1.631 | 1.783 | 2.215 |

TABLE 2

| Items | Application Example 1 | Application Example 2 | Application Example 3 | Application Example 4 | Application Example 5 | Application Example 6 | Application Comparative Example 1 | Application Comparative Example 2 | Application Comparative Example 3 |
|---|---|---|---|---|---|---|---|---|---|
| Silicon-carbon composite material | A-1 | A-2 | A-3 | A-4 | A-5 | A-6 | B-1 | B-2 | B-3 |
| Powder D50 (μm) | 12 | 20 | 15 | 18 | 15 | 18 | 15 | 15 | 18 |
| First week charge capacity (mAh/g) | 460.5 | 526.3 | 480.4 | 613.3 | 510 | 451.2 | 480 | 500 | 445 |
| First week coulomb efficiency (%) | 83.2 | 84.5 | 82.5 | 85.5 | 81.2 | 82.2 | 60.3 | 63.4 | 72.1 |
| 50-cycle capacity retention rate (%) | 97.5 | 96.5 | 92.3 | 94.2 | 98.2 | 88.2 | 10.6 | 25.5 | 76.4 |

Figure 2:
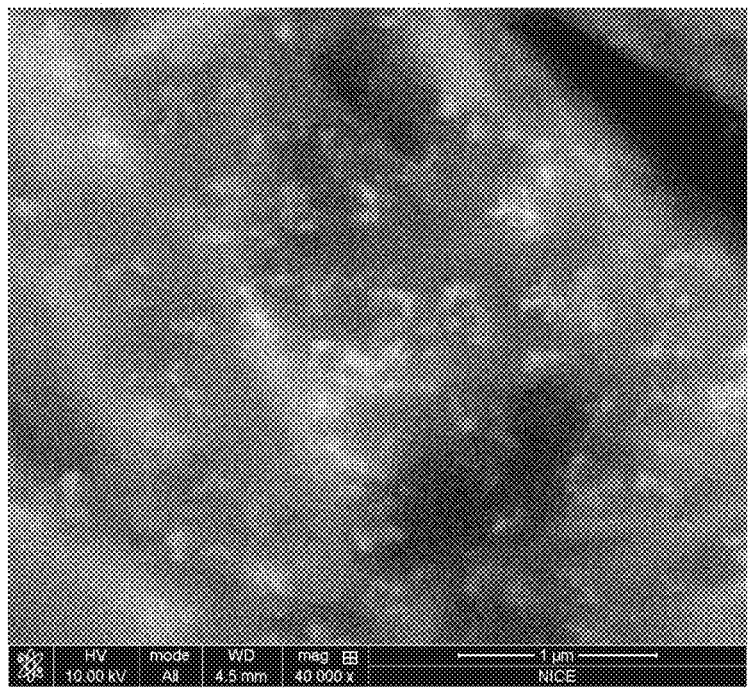
FIG. 2 illustrates a Scanning Electron Microscopy (SEM) image of the silicon-carbon composite material prepared in Example 5 under the backscattered electrons.

As can be seen from the results of Table 2, the silicon-carbon composite materials prepared in Examples 1-6 used as the negative electrode material can improve the first coulomb efficiency and the 50-cycle capacity retention rate of the lithium ion battery (i.e., improve the cycle stability of the battery), as compared with the silicon-carbon composite materials prepared in the Comparative Examples 1-3. In addition, FIG. 1 and FIG. 2 illustrate a HR-TEM image and a SEM image of the silicon-carbon composite materials prepared in Example 5. As shown in FIG. 1, the graphitic phase in the silicon-carbon composite material is dispersed in the amorphous carbon with a nano-scale thickness (10-20 nm); the bright spot part of FIG. 2 illustrates the nanometer silicon particles, it can be seen from the figure that the nanometer silicon is uniformly dispersed in the silicon-carbon composite material matrix. In addition, the HR-TEM observations of the silicon-carbon composite materials prepared in Examples 1-4 and 6 show that the graphite phase is also dispersed in the amorphous carbon in a nano-scale thickness (10-25 nm).

The preferred embodiments of the present disclosure have been described above in detail, but the present disclosure is not limited thereto. Within the scope of the technical idea of the present disclosure, many simple modifications can be made to the technical solution of the present disclosure, including various technical features being combined in any other suitable way, and these simple modifications and combinations should also be regarded as the disclosure of the present disclosure, and all fall within the scope of the present disclosure.

The invention claimed is:

1. A silicon-carbon composite material comprising a composite carbon material and nanometer silicon dispersed therein, wherein the composite carbon material is consisting of a graphitic crystal phase and an amorphous carbon phase, wherein the ratio $I_{002}/I_{amor}$ of the peak intensity $I_{002}$ of the graphite crystal phase (002) plane relative to the peak intensity $I_{amor}$ of the amorphous carbon phase as measured by X-Ray Diffraction (XRD) is within a range of 0.1-40, and the content of the graphite crystal phase in the composite carbon material is not less than 5 wt %.

2. The silicon-carbon composite material of claim 1, wherein the nanometer silicon in the silicon-carbon composite material is present within a range of 1-50 wt %, further wherein, the nanometer silicon is selected from nanometer silicon powder and/or nanometer silicon monoxide.

3. The silicon-carbon composite material of claim 1, wherein the normalized ratio $I_{002}/I_{amor}$ of the peak intensity $I_{002}$ of the graphite crystal phase (002) plane relative to the peak intensity $I_{amor}$ of the amorphous carbon phase is within a range of 0.1-60.

4. The silicon-carbon composite material of claim 1, wherein the ratio $I_{002}$/FWHM of the peak intensity $I_{002}$ of the graphite crystal phase (002) plane relative to the full width at half maximum (FWHM) of the peak is within a range of 1,000-80,000.

5. The silicon-carbon composite material of claim 1, wherein the dispersion coefficient δ of the ratio Id/Ig of Id and Ig as measured by Raman spectrum is less than 0.8.

6. The silicon-carbon composite material of claim 1, wherein the true density p of the silicon-carbon composite material is within a range of 1.8-2.3 g/cm$^3$.

7. A method of preparing the silicon-carbon composite material of claim 1, the method comprising steps of:
  1) Subjecting raw materials consisting of a matrix material, a filler and the nanometer silicon to multi-stage mixing so as to obtain a mixture product, wherein the multi-stage mixing comprises:
    (1) mixing the raw materials under an ambient temperature for 1-6 hours; then
    (2) blending the raw materials for 0.5-3 hours in the process of heating to 10-50° C. higher than the softening temperature of the matrix material; and then
    (3) blending the raw materials for 2-10 hours at a constant temperature of 10-50° C. higher than the softening temperature of the matrix material; and then
    (4) blending the raw materials for 0.5-3 hours in the process of cooling to the ambient temperature; and circulating stages (1) to (4) for multiple times, wherein the total time of the multi-stage mixing is within a range of 10-150 hours, to form a mixture product;
  2-1) oxidizing the mixture product, and subsequently carrying out carbonization of the mixture product in a carbonization furnace; or
  2-2) subjecting the mixture product to the mold pressing carbonization in a mold;
  wherein the matrix material forms the amorphous carbon phase by carbonization, and the filler is selected from graphite and/or graphene.

8. The method of claim 7, wherein the matrix material in step 1) is selected from the group consisting of petroleum asphalt, coal pitch, mesophase pitch, Direct Coal Liquefaction Residue, heavy aromatic hydrocarbons, epoxy resins, phenolic resins, urea-formaldehyde resins, furfural resins, polyvinyl alcohol, polyethylene glycol, polyvinylidene fluoride, polyacrylonitrile, and a combination thereof.

9. The method of claim 8, wherein the mixture raw material is prepared by blending the matrix material, the filler and the nanometer silicon in a blender mixer for 1-16 hours; wherein both the matrix material and the filler are blended in the blender mixer in particulate form; further wherein the mesh number of the matrix material is more than 50 meshes, and the mesh number of the filler is more than 80 meshes.

10. The method of claim 7, wherein the mass ratio of the matrix material to the filler in step 1) is 1:0.1-5.

11. The method of claim 7, wherein the multi-stage mixing in step 1) is performed by means of one of ball milling, blending-kneading and banburying or a combination thereof.

12. The method of claim 7, wherein the oxidation in the step 2-1) is performed in an oxidizing atmosphere, wherein the temperature of the oxidation is within a range of 220-350° C., and the oxidation time is within a range of 1-16 hours; or
  the oxidation is performed in a strong oxidizing acid, the temperature of the oxidation is within a range of 25-100° C., and the oxidation time is within a range of 0.5-12 hours.

13. The method of claim 7, wherein in step 2-2), the mold pressing carbonization is conducted at a temperature within a range of 600-1,600° C., the pressure applied to the surface of the mixture is within a range of 10-50 MPa, and the mold pressing carbonization is performed for a duration of time within a range of 1-10 hours.

14. The method of claim 7, wherein the method further comprises:
  3) Subjecting a carbonized product obtained in step 2-1) or step 2-2) to pulverization and grading to form a powder; wherein the median particle diameter of the powder obtained by step 3) is within a range of 5-20 μm.

15. A method of the silicon composite material of claim 1 in a lithium ion battery.

* * * * *